UNITED STATES PATENT OFFICE.

OSCAR F. GEORGE, OF BLACK BROOK, NEW YORK.

REMEDY FOR DYSPEPSIA.

SPECIFICATION forming part of Letters Patent No. 414,901, dated November 12, 1889.

Application filed August 21, 1889. Serial No. 321,535. (No specimens.)

*To all whom it may concern:*

Be it known that I, OSCAR F. GEORGE, of Black Brook, in the county of Clinton and State of New York, have invented a new and Improved Medicine for Dyspepsia and other Kindred Diseases, of which the following is a full, clear, and exact description.

My invention consists in a new composition of matter to be used as a medicine for the relief of dyspepsia or indigestion and other ailments and symptoms associated therewith.

My composition is made up of three different mixtures, which combined constitute the medicine. These mixtures are composed of the following ingredients combined substantially in the proportions stated, viz:

First a mixture having for its ingredients water, twelve ounces; glycerine, twelve ounces; pepsin, (scale,) preferably that known and sold as "Park, Davis & Co.'s," one ounce, by weight; hydrochloric acid, chemically pure, one ounce. These several ingredients to be mixed together.

The second mixture is composed of oil of anise-seed, two ounces; oil of gaultheria, one ounce; alcohol, one and a half ounce; fluid extract of cubebs, nine drams, (liquid measure.) These ingredients likewise to be mixed together.

The third mixture is composed of glycerine, twelve ounces; simple sirup, thirty-four ounces; fluid extract of hydrastis canadensis, eighteen ounces; hydrochloric acid, chemically pure, one ounce. These ingredients are also mixed together separate from the two preceding separate mixtures, and as soon as the pepsin in the first of said mixtures is dissolved the three mixtures are all combined and mixed together, which united mixture constitutes my improved dyspeptic specific or medicine, for making about three quarts of which the foregoing is the formula.

I do not restrict myself to the precise proportions of the ingredients herein stated, as these may be somewhat changed.

The dose is from a half to a tea-spoonful in a wine-glass of water after each meal.

Having thus described my invention, what I claim as new, and desire to secure by Letters Patent, is—

The herein-described composition of matter to be used as a medicine for dyspepsia and other kindred diseases, consisting of water, glycerine, pepsin, hydrochloric acid, oil of anise-seed, oil of gaultheria, alcohol, fluid extract of cubebs, simple sirup, and the fluid extract of hydrastis canadensis, prepared and combined substantially as and in or about the proportions specified.

OSCAR F. GEORGE.

Witnesses:
 BENJ. E. WELLS,
 I. H. BULLEN.